Figure 1:
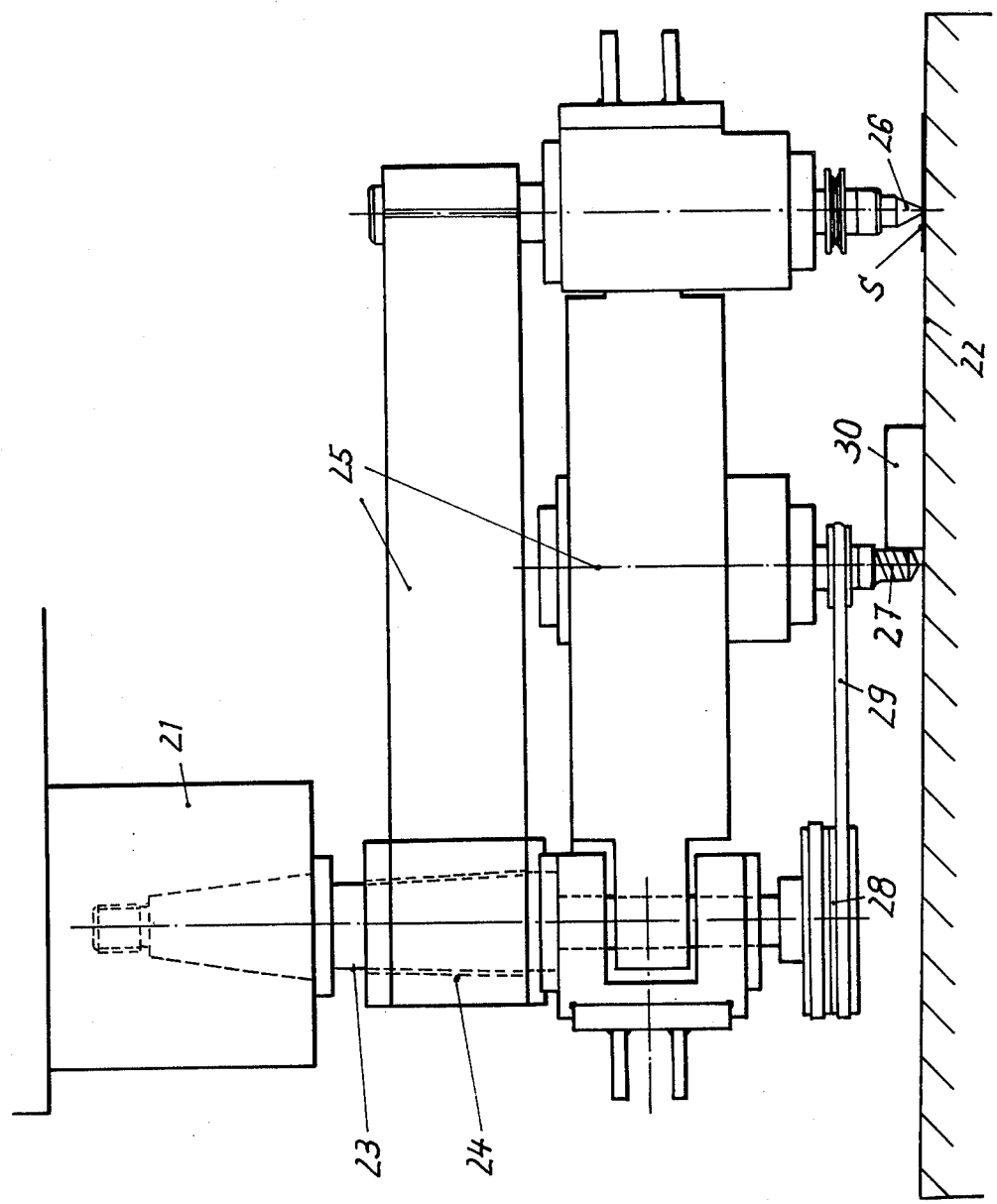

United States Patent [19]
Härlin

[11] 4,099,446
[45] Jul. 11, 1978

[54] PANTOGRAPH COPYING ATTACHMENT

[75] Inventor: Herbert Härlin, Pforzheim-Eutingen, Fed. Rep. of Germany

[73] Assignee: Karl Harlin & Co., Pforzheim-Eutingen, Fed. Rep. of Germany

[21] Appl. No.: 746,807

[22] Filed: Dec. 2, 1976

[30] Foreign Application Priority Data

Dec. 18, 1975 [DE] Fed. Rep. of Germany ....... 2556965

[51] Int. Cl.² .......................... B23C 1/16; B23C 7/00
[52] U.S. Cl. .................................. 90/13.1; 33/25 R; 51/100 P
[58] Field of Search ............................. 90/13.1, 13.2; 51/100 P; 144/144 A; 125/11 PT; 33/23 R, 23 F, 25 R, 25 B, 25 E

[56] References Cited

U.S. PATENT DOCUMENTS

2,600,402   6/1952   Griffin ................................ 33/25 R

FOREIGN PATENT DOCUMENTS

985,910   7/1951   France ................................. 33/25 R

Primary Examiner—Othell M. Simpson
Assistant Examiner—F. R. Bilinsky

[57] ABSTRACT

The attachment is intended for use with a machine tool comprising rotary tool means and a rotary spindle for driving said tool means and comprises a shaft adapted to be connected to said spindle for rotation therewith, a rotary bearing carried by said shaft, a pantograph mounted on said bearing for an angular movement relative to said shaft about the axis thereof and adapted to carry said tool means at a distance from said axis, a tracer carried by said pantograph at a distance from said axis, and an angled drive mechanism and operatively connected to said main shaft and adapted to be operatively connected to said tool means when they are carried by said pantograph. Said tool means are adapted to be driven from said spindle through said drive means during an angular movement of said pantograph about said axis.

5 Claims, 5 Drawing Figures

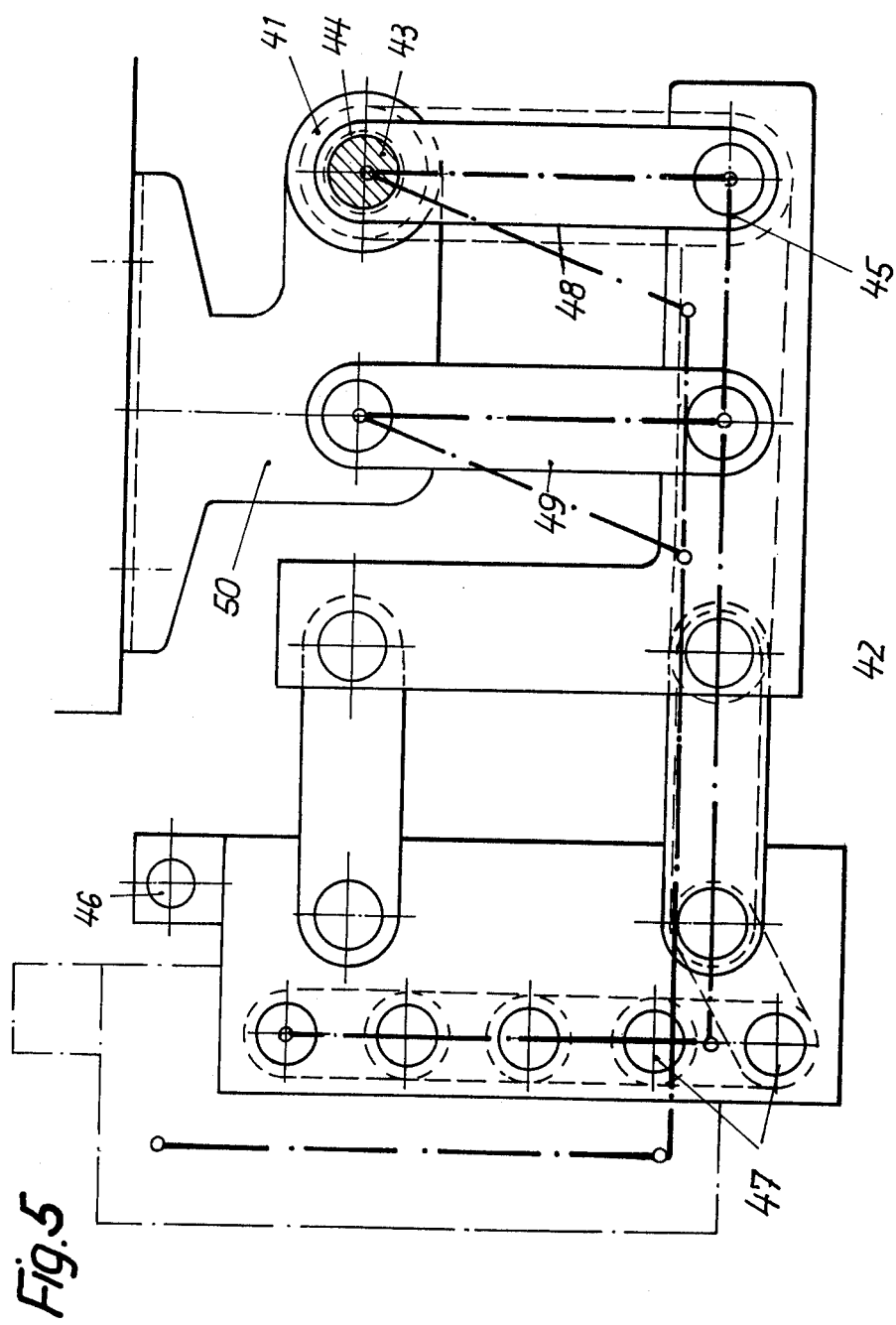

PANTOGRAPH COPYING ATTACHMENT

This invention relates to a pantograph copying attachment.

Known pantograph copying attachments constitute self-contained machines, comprising a machine table, drive means, and mountings for pantographs consisting of a single parallel-crank linkage or of two parallel-crank linkages connected in series by a common link. These attachments do not enable a copy milling with satisfactory results unless expensive means are provided for driving and precisely mounting the pantographs.

From Opened German Specification No. 2,110,574 it is also known to provide arc-milling attachments which are mounted on a drive shaft and consist of swivelling gear mechanisms. In that case the radius of the arc which can be milled depends on the size of the idler gear of the mechanism and only arcs having predetermined radii can be milled.

It is an object of the invention to enable a precision copy milling in two or three dimensions on existing milling machines, even by home workers, by the provision of an attachment which can simply be mounted on the machine. In a pantograph copying attachment this object is accomplished according to the invention in that the main shaft of the attachment is adapted to be mounted by a rotary bearing on the tool spindle of a milling or drilling machine so that the main shaft is driven by the tool spindle, and the main shaft is provided with an angled and/or speed-changing gear and belt mechanism for driving the copy milling cutter. In such arrangement, the precise and stable mounting and driving means of existing milling or drilling machines can also be used to mount and drive a pantograph copying attachment. This is particularly advantages with stationary machines for use by home workers. To that end, the main shaft of the pantograph copying attachment is adapted to be chucked to one end of a vertical or horizontal drive shaft of the milling or drilling machine.

The pantograph copying attachment can preferably be detachably mounted in that its main shaft, serving as a drive shaft, is provided with a connecting cone, which is chucked to the end of the spindle of the milling or drilling machine, the rotary bearing for mounting the pantograph is rotatably mounted on the main shaft, and the drive for the copy milling cutter is derived from the protruding shaft end. In this way, even stationary drilling and milling machines for use by home workers can be provided in a simple manner with a pantograph attachment which enables a copy milling in two or three dimensions.

Figure 2:
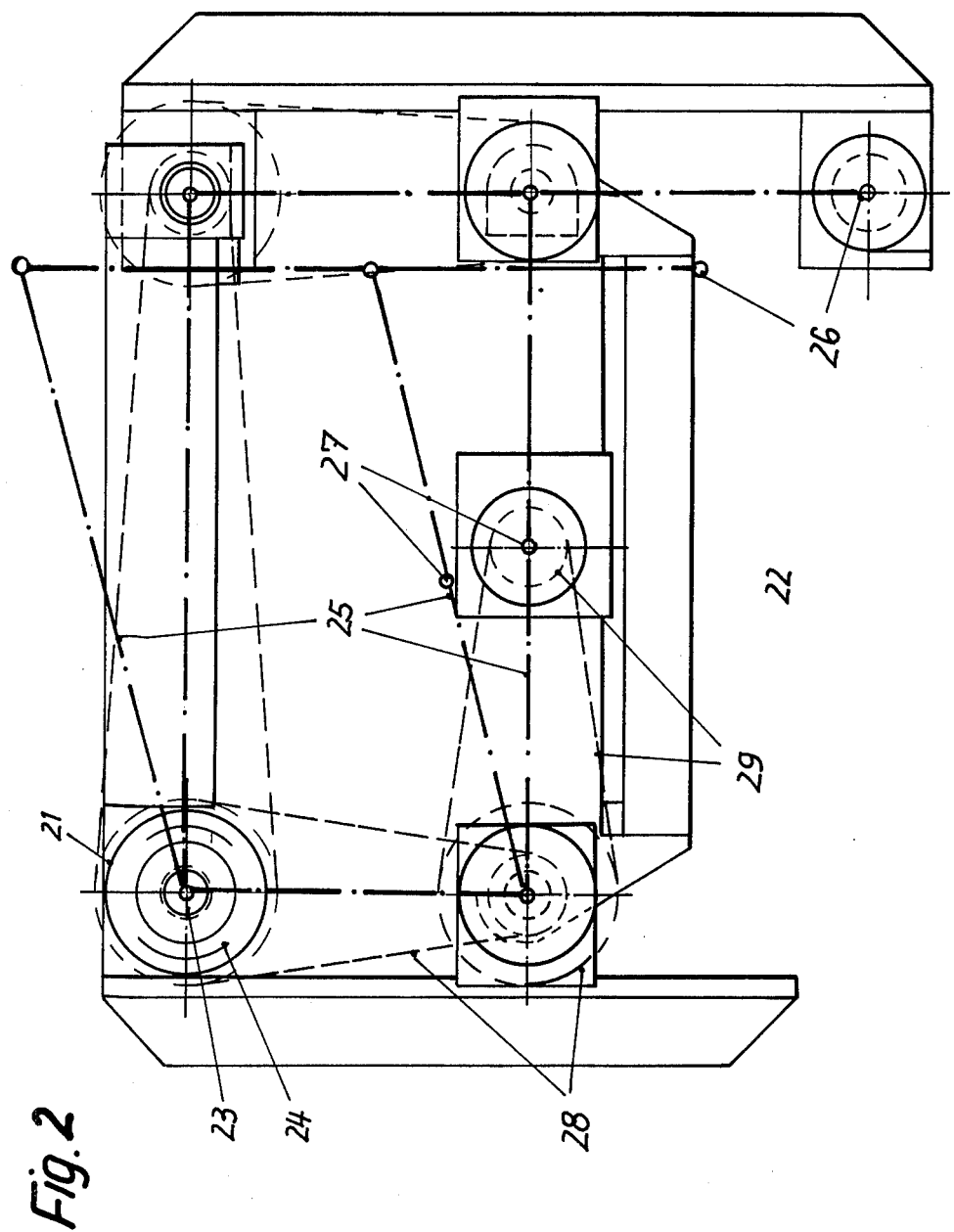
Figure 3:
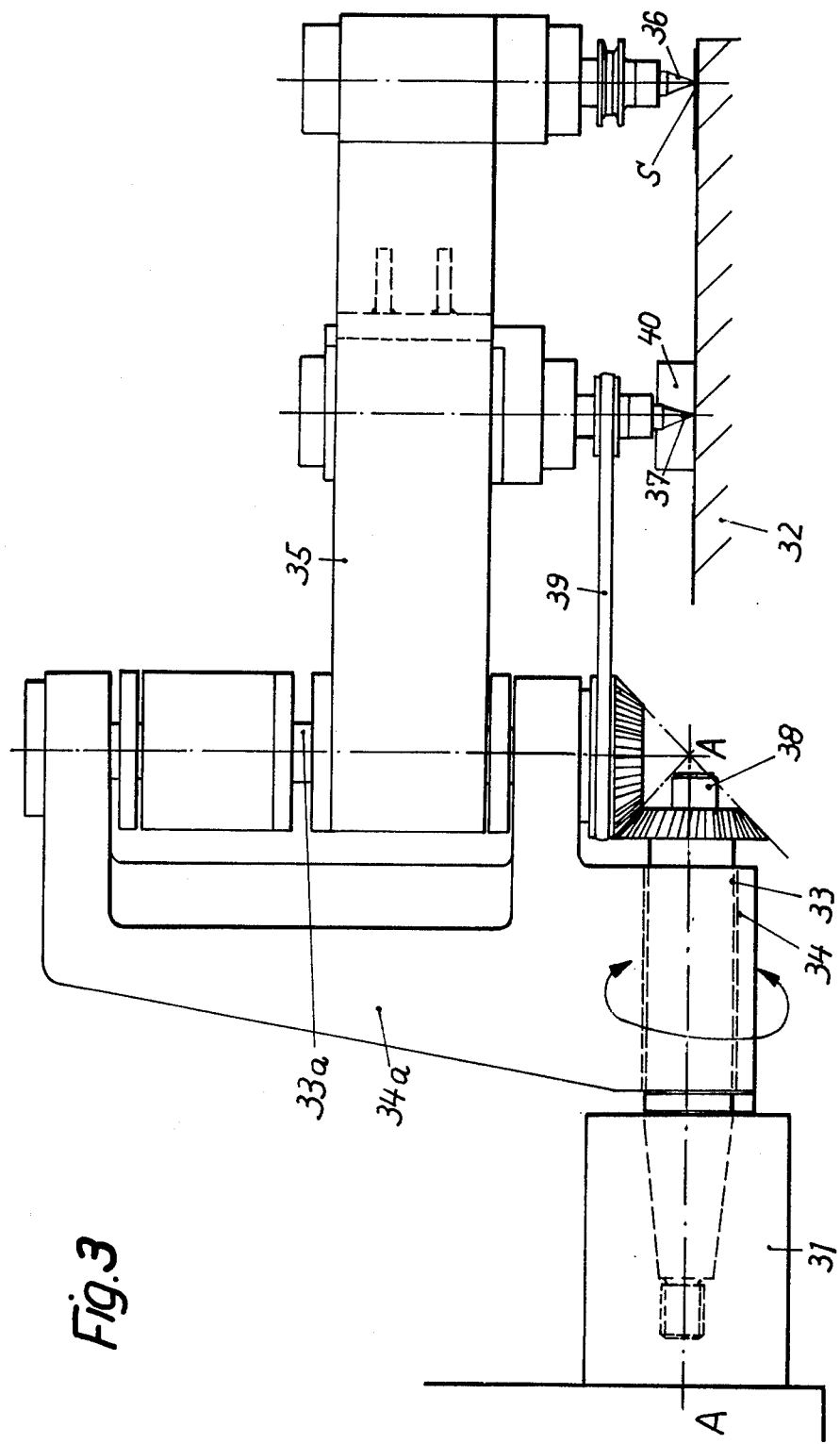
Figure 4:
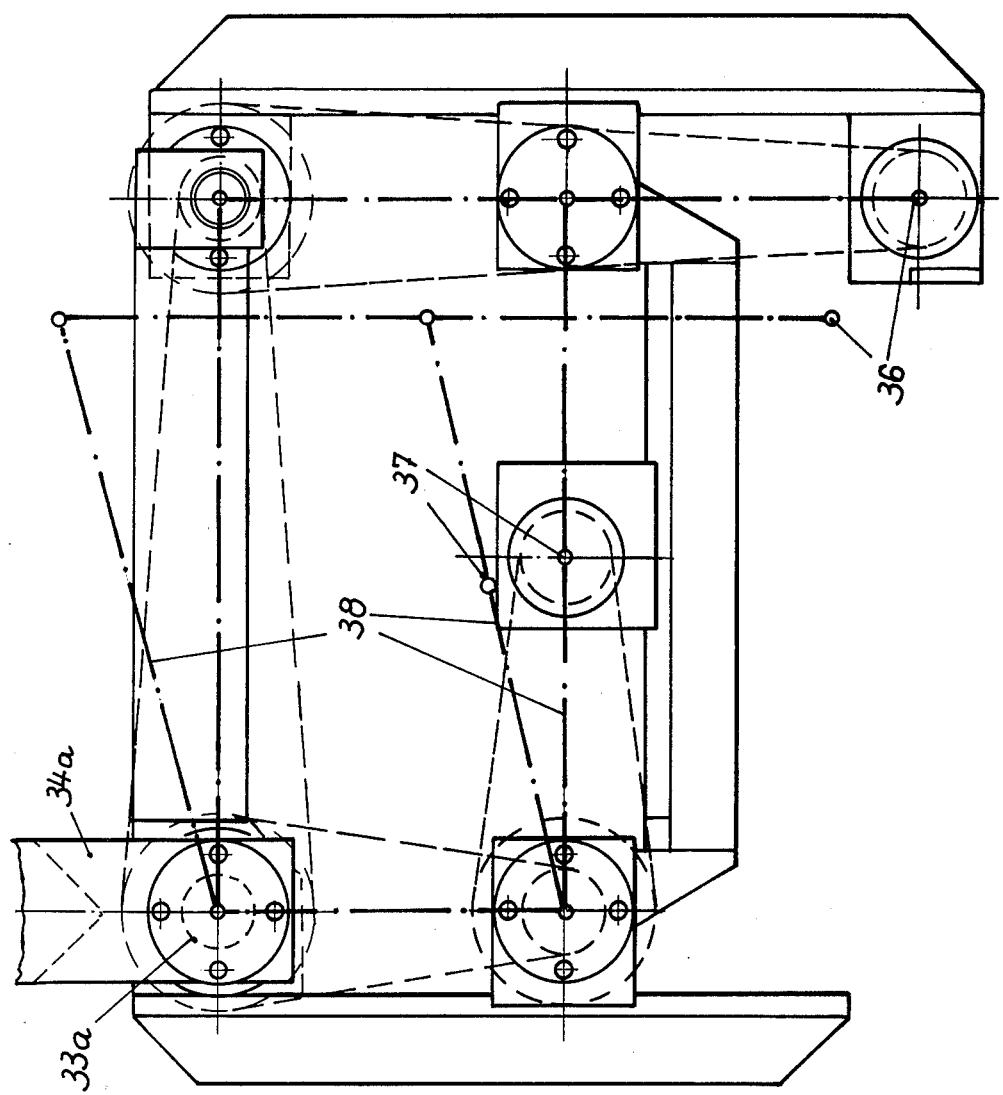

Embodiments of copying attachments to the invention, comprising a single parallel-crank linkage or two parallel-crank linkages having a common link are shown by way of example on the drawing, in which FIGS. 1 and 2 are, respectively, a front elevation and top plan view showing an attachment mounted on a vertical drive spindle and comprising a single parallel-crank linkage, FIGS. 3 and 4 are, respectively, a front elevation and top plan view showing a mechanism mounted on a horizontal drive spindle and comprising a single parallel-crank linkage and FIG. 5 is a top plan view showing a mechanism mounted on a vertical drive spindle and two parallel-crank linkages connected in series by a common link.

In the first embodiment, shown in FIGS. 1 and 2, a shaft 23 is chucked to a vertical drive spindle 21 of a milling or driling machine, which comprises a stationary or wheeled table 22. The shaft 23 carries by means of an intermediate bearing 24 a pantograph 25, which comprises a single parallel-crank linkage and carries a tracer 26 and a milling cutter 27. the latter is driven from the drive spindle 21 by means of an angled speed-changing gear and belt drive 28, 29. When the tracer 26 is moved along a curved portions S of a template, as is usual with pantographs attachments, the milling cutter 27 will copy that curved portion on a workpiece 30 on a reduced scale. The demagnification or magnification can be selected by an adjustment of length ratio of the pantograph links. It is apparent that the present attachment can be mounted in a simple manner as an attachment to a stationary home worker machine.

In the second embodiment, shown in FIGS. 3 and 4, a system shaft 33 is chucked to a horizontal drive spindle 31 of a milling or drilling machine having a stationary or wheeled table 32. By means of an intermediate bearing 34, an angle bracket 34a and a vertical shaft 33a, the shaft 33 carries a pantograph 35, which consists of a single parallel-crank linkage and is provided with a tracer 36 and a milling cutter 37. The latter is driven from the drive spindle by means of an angled bevel gear and belt drive 38, 39. When the tracer 36 is moved along a curved portion S of a template, as is usual with pantograph attachments, the milling cutter 37 will copy that portion on the workpiece 40 on a reduced scale. This attachment permits of a copy milling in the plane of the pantograph and also in a third dimension because the angle bracket 34a is pivotally movable about the axis A—A.

In the last embodiment, shown in FIG. 5, a system shaft 43 is chucked to a drive spindle 41 of a milling or drilling machine, which comprises a table 42. A pantograph 45 consisting of two parallel-bar linkages which are connected in series by a common link is provided with a tracer 46 and with ganged milling cutters 47, and is connected to the shaft 43 by an intermediate bearing 44. The milling cutters 47 are again driven from the drive spindle 41 by means of an angled speed-changing gear and belt drive. In this attachment one parallel-crank linkage comprises a first link 48 which is mounted on the bearing 44, and a second link 49, which is parallel to the first link 48 and pivoted to a fixed point of the machine, e.g., to an angle bracket 50 secured to the spindle nose. This attachment comprising a pantograph which consists of two parallel-crank linkages connected in series by a common link can be used for a simultaneous machining of a plurality of workpieces in a number that depends on the number of ganged milling cutters 47.

What is claimed is:

1. A pantograph copying attachment for a machine tool having a rotary spindle adapted for receiving and driving a tool about an axis which attachment comprises a main shaft having connecting means adapted to be connected to said spindle for rotation therewith, a bearing rotatably carried by said main shaft, a pantograph mounted on said bearing for an angular movement relative to said shaft about the axis thereof said pantograph including means to carry tool means at a distance from said axis, a tracer carried by said pantograph at a distance from said axis, and an angled tool drive mechanism connected to said main shaft and said tool means whereby said tool means is driven from said spindle through said drive means during said angular movement of said pantograph about said axis.

2. A pantograph copying attachment as set forth in claim 1, in which said drive mechanism comprises a belt drive.

3. A pantograph copying attachment as set forth in claim 1, in which said drive mechanism comprises a speedchanging transmission.

4. A pantograph copying attachment as set forth in claim 1, in which
 said main shaft connecting means comprises a cone which is adapted to be detachably connected to one end of said spindle,
 said tool drive mechanism is connected to said main shaft at the opposite end thereof, and
 said rotary bearing is mounted on an intermediate portion of said main shaft.

5. A pantograph copying attachment as set forth in claim 1, wherein said machine tool includes a nose in which said spindle is rotatably mounted,
 said pantograph comprises two parallel-crank linkages connected in series by a common link,
 one of said linkages comprises a first link mounted on said bearing and a second link, which is parallel to said first link and adapted to be detachably pivoted to said nose, and
 another of said linkages carries said tracer and is adapted to carry said tool means.

* * * * *